United States Patent [19]

Taggart et al.

[11] 4,437,488
[45] Mar. 20, 1984

[54] SOLENOID VALVE FOR HOT MELT MATERIAL

[75] Inventors: Thomas D. Taggart, Pacific Grove; Robert E. Taggart, Carmel, both of Calif.

[73] Assignee: Lockwood Technical Inc., Monterey, Calif.

[21] Appl. No.: 381,040

[22] Filed: May 24, 1982

[51] Int. Cl.³ .......................... F16K 49/00; B05B 1/30
[52] U.S. Cl. .................................... 137/334; 137/341; 251/86; 251/141; 251/285; 239/585
[58] Field of Search .................. 251/127, 129, 86, 87, 251/141, 285, 118; 239/583, 585, 135; 137/341

[56] References Cited

U.S. PATENT DOCUMENTS

| | | | |
|---|---|---|---|
| 906,331 | 12/1908 | Struble et al. | 251/129 |
| 1,323,778 | 12/1919 | Lemp | 239/585 |
| 2,930,404 | 3/1960 | Kowalski et al. | 251/285 |
| 3,218,022 | 11/1965 | Lewis | 251/141 |
| 3,366,288 | 1/1968 | Goldschein | 251/141 |
| 3,485,417 | 12/1969 | Cocks | 251/139 |
| 3,695,516 | 10/1972 | Rogers | 239/135 |
| 3,791,408 | 2/1974 | Saitou et al. | 251/129 |
| 4,331,317 | 5/1982 | Kamai et al. | 239/585 |
| 4,392,634 | 7/1983 | Kita | 251/141 |

FOREIGN PATENT DOCUMENTS

| | | | |
|---|---|---|---|
| 1915265 | 10/1970 | Fed. Rep. of Germany | 251/285 |
| 5789 | of 1908 | United Kingdom | 251/285 |

Primary Examiner—A. Michael Chambers
Attorney, Agent, or Firm—Thomas H. Olson

[57] ABSTRACT

A solenoid valve for controlling the flow of hot melt material such as hot melt adhesive. The valve includes an aluminum body in which is disposed a heater cartridge for supplying heat energy to the body. The body is bored to receive an insert constructed of brass of like material having good heat conductivity and the insert defines a cylindric passage. Extending through the cylindric passage is a valve stem that has an outer diameter less than the inner diameter of the cylindrical passage so that an annular flow path is formed. Hot melt material supplied to one end of the annular flow path flows to a valve seat at the other end of the flow path. The diameters of the cylindric passage and the valve stem are established so that the annular path has a sufficiently small radial dimension (e.g. 0.004 inch) that the hot melt material in the path is rapidly and efficiently heated so that when discharged through the valve seat it will be at a suitable operating temperature.

A solenoid coil assembly is mounted exterior of the body by a threaded connection between the assembly and the body so that relative rotation therebetween changes the relative axial position of the solenoid assembly and the body. The valve stem is attached to a core within the solenoid assembly so that the stroke of the stem is adjusting the relative rotational position of the body and the solenoid assembly.

Rigid with the body is a support housing formed of stainless steel or like low heat conductivity material. The solenoid assembly is attached to the housing so that flow of heat from the body to the solenoid is attenuated by the housing, and the solenoid thus operates at a relatively low temperature.

9 Claims, 4 Drawing Figures

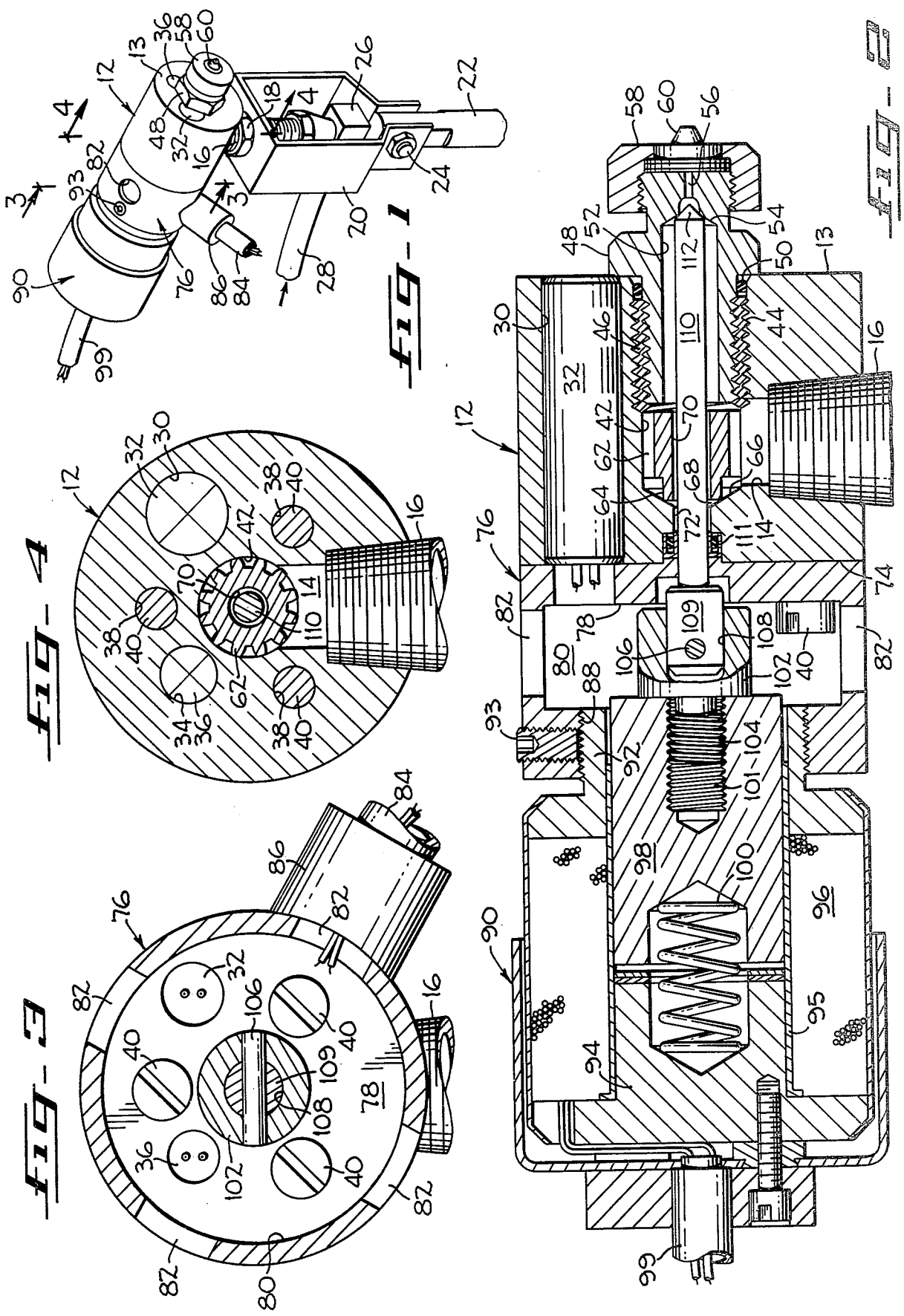

SOLENOID VALVE FOR HOT MELT MATERIAL

BACKGROUND OF THE INVENTION

1. Field of the Invention

This invention relates to a valve for controlling the flow of hot melt material and more particularly to such valve that is solenoid operated, affords superior temperature control of the material controlled thereby and provides for adjustment of stroke without disassembly.

2. Description of the Prior Art

Valves for controlling the flow of hot melt material can be controlled by hydraulic or pneumatic actuators. Such actuators, however, are relatively slow. Hot melt material valves can be actuated by a solenoid. Solenoid valves can be overly complex and the temperature of the hot melt material that is controlled by the valve can adversely affect the electrical components of the solenoid.

A gun having a solenoid operated valve for hot melt material is disclosed in U.S. Pat. No. 3,485,417. The stroke of the patented valve can be adjusted only by partially disassembling the valve.

SUMMARY OF THE INVENTION

The main body of a valve according to the present invention is formed of material that is a good heat conductor, such as aluminum. The main body defines a bore in which is disposed an insert also constructed of material having good heat conductivity, such as brass. The fit between the wall of the bore and the outer surface of the insert is a close one so as to establish a good heat conducting relationship between the main body and the insert. Within the body is a heating element such as an electric powered heater cartridge, so that the wall defining the bore and the insert reside at an elevated temperature. The insert defines a central cylindric passage through which a valve stem extends. The outside diameter of the valve stem is slightly less than the inside diameter of the central cylindric passage so that an annular space is defined between the surface of the valve stem and the surface of the passage. This annular space forms a path for flow of the hot melt material. The stem and passage are dimensioned so that the radial extent of the annular space maintains the thickness of hot melt material traversing the annular space to a small amount (e.g. 0.004 inch) such that the hot melt material, a poor heat conductor, affords insignificant impedance to heat flow therethrough. Accordingly, the hot melt material can be heated to optimum working temperature when it is delivered from a valve incorporating the invention.

Immovably mounted to the above mentioned main body in communication with the central cylindric passage is a valve seat. The valve stem has a conical tip shaped for cooperation with the seat to arrest flow therethrough. The end of the valve stem remote from the seat is fastened to the core of the solenoid valve; the core is disposed within a solenoid coil that is supported in a housing. The coil housing is threadedly joined to the main body so that rotation of the coil housing relative to the main body effects adjustment of the valve stroke. Such adjustment can be made without any disassembly of the valve.

Between the coil housing and the main body is a heat insulative body formed of material with poor heat conductivity, such as stainless steel. The insulative body is shaped to provide a heat path of small cross sectional area between the main body and the coil housing so as to reduce heat flow to the coil housing. Additionally, the heat insulative body is apertured to afford air circulation therethrough, thus further to reduce heat flow from the body to the coil housing.

An object of the invention is to provide a valve for hot melt material which enhances heat conduction to the hot melt material so that when the material is dispensed from the valve it is at optimum temperature. In one test, a valve not embodying the invention contained a heater that maintained the valve body at 360° F. Hot melt material supplied to the input of such valve was at 325° F. The output temperature of the hot melt material, except at very low delivery rates, was about 290° F. In contrast, a valve embodying the present invention under the same temperature conditions noted above produce hot melt material at the outlet thereof at about 310° F. This characteristic is particularly advantageous when handling hot melt materials that disintegrate if maintained at a high temperature for a substantial period.

Another object of the invention is to provide a solenoid operated valve for hot melt material wherein the solenoid is maintained at a relatively low temperature. In the valve noted previously, although the main body of the valve operated at temperatures up to about 500° F., the temperature of the solenoid was only about 200° F. This enhances the longevity of the solenoid and the insulation that constitutes a part thereof.

The foregoing, together with other objects, features, and advantages, will be more apparent after referring to the following specification and accompanying drawing.

BRIEF DESCRIPTION OF THE DRAWING

FIG. 1 is a perspective view of a valve embodying the invention.

FIG. 2 is a central sectional side view of a valve embodying the invention with portions rotated to the plane of the section for purposes of illustration.

FIG. 3 is a cross sectional view taken on line 2—2 of FIG. 1.

FIG. 4 is a cross sectional view taken on line 3—3 of FIG. 1.

DETAILED DESCRIPTION OF THE PREFERRED EMBODIMENT

Referring more particularly to the drawing, reference numeral 12 generally indicates the main body of a valve constructed in accordance with the invention. Body 12 is formed of aluminum or like material having good heat conducting properties. Body 12 has a front surface 13 and is formed with a radially extending bore 14 rearward of the front surface. The bore is internally threaded to receive an inlet fitting 16. Inlet fitting is serves to mount the valve and to define an inlet path for hot melt material. The inlet fitting is externally threaded and there are mounting nuts, one of which is seen at 18 in FIG. 1, to secure the fitting and the valve to a support bracket 20. Support bracket 20, at a location remote from the valve, is secured to a mounting rod 22 which can be fixed to any suitable frame (not shown) to support the valve in a working position. A bolt 24 joins bracket 20 to mounting rod 22 so as to permit appropriate angular adjustment.

At the distal end of the inlet fitting 16 there is a right angle fitting 26 to which a hot melt hose 28 is connected. Hot melt material in a molten state and under pressure is supplied to hose 28 by conventional equipment (not shown.)

Main body 12 defines several axially extending bores that are positioned outward of the central axis of the body. There is a bore 30 in which an electric cartridge heater 32 is installed. There is a bore 34 in which a thermo-electric temperature sensor 36 is installed. Because the heater and the temperature sensor are conventional elements and because there interconnections are well understood by those skilled in the art, no further description of those elements or their interconnections are given. Suffice it to say, heat produced by cartridge heater 32 heats the main body 12 to a suitable temperature which is monitored by temperature sensor 36 so that the temperature is maintained at a prescribed level. Also extending axially of main body 12 are three uniformly spaced apart threaded holes 38 which receive assembly screws 40 to retain the parts of the apparatus in assembled relation.

Centrally of main body 12 is a bore that has a cylindric portion bounded by a concave cylindric wall 42 which is spaced inward of front surface 13. Between cylindric wall 42 and front surface 13 is a passage 44 in which a Helicoil 46 is installed. The threaded portion of a valve seat body 48 is retained in passage 44 by the threads formed by Helicoil 46.

At the outer end of passage 44 there is an O-ring 50 for effecting a positive seal between valve seat body 48 and main body 12. Valve seat body 48 has an inlet bore 52 at the end of which is formed a tapered or conical valve seat 54. Extending from seat 54 to the outer extremity of the valve body is an outlet passage 56. Threaded on to the exterior of valve seat body 48 is a nozzle retaining nut 58 which retains a nozzle 60 in communication with outlet passage 56. The shape of nozzle 60 and the orifice therein are selected in accordance with well-known criteria.

Disposed in the chamber formed by cylindric wall 42 is an insert 62. Insert 62 has a substantially cylindrical exterior surface so as intimately to contact cylindric wall 42 and reside in heat conducting relation to main body 12. As seen most clearly in FIG. 4, one suitable form for insert 62 is that of a pinion gear in which the radial extremities of the teeth are turned down so as to lie within a cylindrical surface having a diameter substantially equal to that of cylindric wall 42. The insert is formed of material having good heat conductivity properties, such as brass.

Insert 62 at its right hand end, as viewed in FIG. 2, contacts the inner end of Helicoil 46 so as to retain the insert in place. At its left hand end, the insert is formed with a reduced diameter portion 64. The axial extremity of the reduced diameter portion contacts a tapered surface 66 at the inner end of cylindric wall 42 so as to define a circumferential channel 68 of roughly triangular cross-sectional shape which communicates with inlet passage 14. Insert 62 is formed with a central cylindric bore 70 which extends from circumferential channel 68 to inlet bore 52. Main body 12 is formed with an axially extending clearance bore 72 which extends from tapered surface 66 to the rear surface 74 of the main body.

Fastened to the rear surface of main body 12 is a housing 76 which is formed of material, such as stainless steel, having low thermal conductivity. Housing 76 has an end wall 78 which defines three clearance holes for registry with threaded holes 38 in main body 12 to receive mounting screws 40 therethrough. Thus the mounting screws retain housing 76 in rigid assembled relation to main body 12. Housing 76 is bored and excised to form a chamber 80. The exterior wall of the housing is drilled to form vent holes 82. As can be seen in FIG. 3, there are four holes 82 in the specific embodiment herein shown and described. Holes 82 provide for air circulation between the exterior of the device and chamber 80 and reduce the cross-sectional area of the heat flow path through the housing. Additionally, one of the holes is employed as a wiring inlet for wires in a cable 84 which has a coupling 86 for fastening the cable to housing 76. The wires at the remote end of cable 84 (not shown) are connected to a suitable power source. Within chamber 80 the wires are connected to cartridge heater 32 and temperature sensor 36 so that main body 12 is maintained at an appropriate temperature. The latter connections are not included in the drawing in order to avoid obscuring the parts of the device. At the end of housing 76 opposite main body 12 a threaded openning 88 is formed; threaded openning is concentric with the central axis of the device, i.e. concentric with insert bore 70 and valve seat inlet bore 52.

A solenoid assembly indicated generally at 90 has an externally threaded extension 92 for engaging the threads of threaded openning 88 in housing 76 so that rotation of solenoid assembly 90 with respect to housing 76 and main body 12 alters the relative axially position of those elements. Housing 76 supports a radially extending set screw 93 which can be tightened to prevent relative rotation between the solenoid assembly and the housing. Solenoid assembly 90 includes a fixed core part 94 supported within a tubular support 95. Circumscribing the exterior of the tubular support is a solenoid coil 96. The solenoid coil extends beyond the fixed core part 94, and there is a movable core part 98 within the coil so that in response to energization of coil 96, movable core part 98 moves to the left as viewed in FIG. 2. The core parts are centrally bored to house a compression spring 100 which biases movable core part 98 outward of coil 96, i.e. toward the right as viewed in FIG. 2. A power cable 99 extends exterior of solenoid assembly 90 for establishing a circuit path for energizing solenoid coil 96.

Formed in the outer end of movable core part 98 is a threaded hole 101 which is coaxial with the central axis of the device. A clevis 102 has a threaded stud 104 which is engaged in threaded hole 101 to fix the clevis to movable core part 98 so that the clevis moves in unison with the movable core part. Clevis 102 has a diametrically extending bore in which a dowel pin 106 is installed. Dowel pin 106 extends through an axial bore 108 in the clevis. Retained within axial bore 108 by dowel pin 106 is a valve stem base 109 which has a cross bore through which the dowel pin extends. The outside diameter of valve stem base 109 is slightly less than the inside of diameter of bore 108 so that the valve stem base can experience a limited degree of pivotal movement with respect to the axis of the dowel. Rigid with valve stem base 109 is a valve stem 110 which extends through clearance bore 72 in main body 12, cylindric bore 70 in the insert 62 and inlet bore 52 in valve body 48. In the left end of clearance bore 72 a seal 111 is installed to prevent escape of hot melt material to the left of the seal. The tip of valve stem 110 remote from base 109 is tapered at 112 so as to seat against valve body seat 54 and arrest flow of material to outlet passage 56 and nozzle 60. The tip moves away from seat 54 in response to energization of coil 96, the amount of movement being limited by abutment between the confronting faces of core parts 94 and 98.

The outer diameter of valve stem 110 is established so that tapered tip 112 is sufficiently large to cooperate with seat 54 to arrest flow to outlet passage 56. The inside diameter of central cylindric bore 70 of insert 62 is established to form with the exterior surface of the valve seat an annular flow passage that has a radial extent that is large enough to permit flow of molten hot melt material therethrough, but is small enough to limit the thickness of the hot melt material to an amount such that the hot melt material affords insignificant impedance to heat energy flow through the hot melt material. Hot melt material is a poor heat conductor, even when it is in the molten state, and by thus limiting the radial extent of the annular passage, even the hot melt material remote from the wall of cylindric bore 70 receives heat energy from insert 62. In one device designed in accordance with the invention, the annular passage has a radial extent about 0.004 inch. Thus as the hot melt material flows through the annular passage between cylindric bore 70 and the exterior surface of valve stem 110, it is maximally heated, i.e. the heat energy transferred from cartridge heater 32 to the hot melt material is maximized.

Before describing the operation of a valve constructed in accordance with the invention, the fabrication or assembly of the valve will be described in order to demonstrate certain advantageous relationships between the elements of the valve. After main body 12 has been bored and threaded as described previously, insert 62 is installed within cylindric wall 42. Because passage 44 is coaxial with the cylindric wall and has a greater diameter than the cylindric wall, installation of the insert is straight forward. As shown in FIG. 2, the insert is oriented so that reduced diameter position 64 of the insert confronts tapered end surface 66 of the chamber formed by cylindric wall 42. Next Helicoil 46 is installed and the left hand end of the Helicoil retains the insert in place. It is not necessary that the Helicoil immovably retain the insert, because fluid pressure in the device will move the insert in a rightward direction against the Helicoil. Then valve seat body 48 is threaded into place with 0-ring 50 installed to form a fluid tight joint. Finally nozzle retainer 58 and nozzle 60 are installed.

From the opposite end of the device, seal 111 is installed in clearance passage 42 and cartridge heater 32 and temperature sensor 36 are placed in their respective bores. Housing 76 is then fastened to the main body by screws 40. As can be seen in FIG. 2, there are openings in housing end wall 78 to afford access to the wire terminals that constitute parts of cartridge heater and the temperature sensor. The latter holes are of smaller diameter than respective bores 30 and 34 so that the cartridge heater and temperature sensor are immovably retained. Next the solenoid and valve stem are assembled and with the valve stem inserted through seal 111, the solenoid subassembly is threaded into the body by engaging the threads on threaded extension 92 with the threads in threaded hole 88 of housing 76. The solenoid subassembly 90 is rotated to a position at which valve tip 112 seats against valve seat 54 when solenoid coil 96 is deenergized and a position at which the valve will move leftward through a stroke of desired length when the coil is energized.

In operation, after assembly as described previously, the valve is mounted adjacent a work piece travel path by clamping rod 22 to a portion of the structure that defines the path and by adjusting the device so that nozzle 60 points to a location on the path at which hot melt material is to be deposited.

Hose 28 is connected to a pressurized source of molten hot melt material so that hot melt material fills inlet passage 14, circumferential chamber 68, the annular space between core 70 and the outer surface of valve stem 110, and the space between the outer surface of the valve stem and valve passage 52. Because the parts of the device are made of aluminum or like heat conductive material, the temperature of the hot melt material is maintained at or near the temperature established by the cartridge heater 32 under the control of temperature sensor 36.

As a work piece nears the location of the device, detectors of conventional form (not shown) detect the presence of the work piece and cause application of an electrical signal via cable 99 to solenoid coil 96. Energization of the solenoid coil retracts moving core part 98 against the force of spring 100 and unseats valve tip 112 from seat 54. The positive pressure of the hot melt material source thus causes expulsion of hot melt material through outlet passage 56 and tip 60. Because the hot melt material, in flowing between circumferential chamber 68 and the valve seat, traverses the radially limited annular space between central insert passage 70 and the outer surface of valve stem 110, it is heated to an optimal degree. The radial extent of the annular space is sufficiently small as to impose insignificant impedance to heat flow from the hot melt material in contact with the portion of insert 60 that bounds bore 70 of the insert to the hot melt material nearer to the surface of valve 110.

The maximum valve opening is determined by the extreme position of leftward travel of core part 98 and valve tip 112, this in turn is established by the axial position of solenoid assembly 90 with respect to housing 76 and main body 12. Because of the threaded connection between threaded opening 88 and threaded extension 92, the axial position of the solenoid assembly can be adjusted from the exterior of the device without any disassembly whatsoever. Thus different flow rates can quickly be accommodated simply by loosening set screw 93, rotating the solenoid subassembly by a suitable amount in a suitable direction, and retightening the set screw.

Thus it will be seen that the present invention provides a solenoid valve for hot melt material which improves the amount of heat energy transferred to the hot melt material. This permits maintenance a relatively low temperature in the material supplied through hose 28 to the device. Once the hot melt material enters the device and particularly enters the annular space between central insert passage 70 and the outer surface of valve stem 110, heat energy from cartridge heater 32 is rapidly applied to the material and the temperature of the material is raised. To reiterate the previously given example, a temperature increase of up to thirty degrees Fahrenheit is possible so that a sufficiently high temperature exists as the material issues from nozzle 60 but the temperature of the material supplied through hose 28 can be low enough to avoid premature deterioration of the material. Additionally, the valve of the invention permits rapid adjustment without any disassembly and provides efficient fabrication and replacement of parts.

Although one embodiment of the invention has been shown and described, it will be obvious that other adaptations and modifications can be made without departing from the true spirit and scope of the invention.

What is claimed is:

1. A valve for hot melt material comprising a rigid body formed of thermally conductive material and having an external front surface, said body defining a bore having a cylindric portion bounded by a concave cylindric wall and being disposed inward of and in spaced apart relation to said front surface, said bore having a passage communicating between said cylindric portion and said front surface, an insert disposed in said cylindric portion, said passage having an inside dimension sufficiently large to afford introduction of said insert therethrough, said insert having an outer surface sized and shaped for disposition in said cylindric portion in heat conducting relation to said cylindric wall, said insert defining a central cylindric passage concentric with said outer surface and with said passage, means mounted in said passage adjacent said front surface and spaced from said insert for defining a valve seat in axial alignment with said central cylindric passage in said insert, a valve member having a cylindric stem extending through said central cylindric passage and a tip engagable with said seat for arresting flow through said seat, said stem having an outer diameter less than the inner diameter of said central cylindric passage so as to form a substantially annular channel between said stem and said central cylindric passage, said annular channel having a radial extent sufficiently large to afford free movement of said stem relative said central cylindric passage and sufficiently small so that hot melt material in said annular channel has insufficient thickness to cause significant impedance to heat energy flow therethrough, said body defining a conduit for delivering hot melt material to said annular channel at the end thereof remote from said valve seat, means for supplying heat energy to said body, and means for selectively reciprocating said valve body from an arrest position at which said tip is engaged with said seat and a flow position at which said tip is spaced from said seat.

2. Apparatus according to claim 1 wherein said body defines a concial surface coaxial with said cylindric wall at the extremity thereof remote from said passage and wherein said insert includes an axial extension of reduced diameter adapted to contact said concial surface and define a chamber circumferentially surrounding said valve stem and communicating with said annular space, said chamber constituting a portion of said conduit.

3. Apparatus according to claim 2 wherein said valve body reciprocating means including a solenoid assembly having a core fixed to said stem and a coil surrounding said core, and means for mounting said core on said body at a site remote from said front surface.

4. Apparatus according to claim 3 wherein said core mounting means includes a portion of said body remote from said passage defining a first threaded part substantially coaxial with said valve stem, said solenoid assembly having a second threaded part for threaded engagement with said first threaded part so that relative rotation of said solenoid assembly and body effects relative axial movement therebetween, said solenoid assembly having an abutment for limiting movement of said core in the flow position, and means for selectively locking said first and second threaded parts against relative rotation.

5. Apparatus according to claim 4 wherein said core mounting means includes a rigid housing formed of material having low heat conductivity, said housing having a first end attached to said body and a portion remote from said first end that constitutes said first threaded part, said housing intermediate said first end and said first threaded part having a wall defining a central cavity, said wall having a plurality of holes for communicating between said cavity and the exterior of said housing so as to afford a substantially unrestricted air flow path through said cavity.

6. A solenoid valve for controlling fluid flow comprising a body defining a bore, means disposed in said bore for forming a fluid discharge passage, said passage forming means having a seat surrounding said discharge passage, an elongate valve stem having a tip for cooperating with said seat to arrest fluid flow through said discharge passage, said stem having a portion remote from said tip that extends exteriorly of said body, a magnetic core part fixed to said portion, a coil circumscribing said core part such that energization of said coil moves said valve tip away from said seat to afford fluid flow through said discharge passage, a coil support member rigid with said coil and having a first threaded part concentrically circumscribing said stem, a second threaded part rigid with said body and complementally engagable with said first threaded part so that rotation of said coil support member relative said body moves said coil toward or away from said seat, means for selectively locking the relative rotational position of said first and second threaded parts, means rigid with said coil for limiting movement of said core part in response to energization of said coil, and means for resiliently biasing said stem away from said limiting means and into engagement with said seat.

7. A solenoid valve according to claim 6 wherein said first threaded part includes a generally cylindric member rigid with said coil support member, said cylindric member having external threads theron, and wherein said second threaded part comprises a cylindric wall rigid with said body and defining an opening having internal threads engagable with said external threads, said cylindric wall having an external surface and means accessible from said external surface for selectively locking said threaded parts against relative rotation.

8. A solenoid valve according to claim 6 wherein said body is formed of heat conductive material and means for applying heat energy to said body so that the temperature of fluid in said bore is raised.

9. A solenoid valve according to claim 8 including an insert disposed in said bore in heat contacting relation to said body, said insert defining an opening circumscribing said valve stem, the internal dimension of said opening and the external dimension of said stem being established to form an annular fluid path sufficiently thin that heat energy is applied to fluid in said annular path without substantial impedance to heat energy flow from said fluid.

* * * * *